United States Patent
Cho et al.

(10) Patent No.: US 9,939,695 B2
(45) Date of Patent: Apr. 10, 2018

(54) DISPLAY DEVICE

(71) Applicant: SAMSUNG DISPLAY CO., LTD., Yongin, Gyeonggi-do (KR)

(72) Inventors: Joowoan Cho, Seongnam-si (KR); Jeongkyun Na, Suwon-si (KR); Seunghwan Lee, Seoul (KR); Byoungho Cheong, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 203 days.

(21) Appl. No.: 14/740,848

(22) Filed: Jun. 16, 2015

(65) Prior Publication Data

US 2016/0091746 A1 Mar. 31, 2016

(30) Foreign Application Priority Data

Sep. 29, 2014 (KR) ........................ 10-2014-0130140

(51) Int. Cl.
*H05K 1/00* (2006.01)
*G02F 1/1345* (2006.01)
*G02F 1/1333* (2006.01)

(52) U.S. Cl.
CPC .... *G02F 1/13452* (2013.01); *G02F 1/133305* (2013.01)

(58) Field of Classification Search
CPC .. G02F 1/13452; H05K 1/0215; H05K 3/361; H02F 1/13452; H02F 1/1345
USPC ......... 361/749–750, 760–764; 174/250–258; 349/149–150
See application file for complete search history.

(56) References Cited

U.S. PATENT DOCUMENTS

| | | | | |
|---|---|---|---|---|
| 6,266,119 | B1* | 7/2001 | Takahashi | G02F 1/13452 349/149 |
| 6,407,795 | B1* | 6/2002 | Kamizono | G02F 1/13452 349/149 |
| 6,583,845 | B1* | 6/2003 | Chung | G02F 1/13452 349/149 |
| 8,895,865 | B2* | 11/2014 | Lenahan | H05K 1/0215 174/254 |
| 2011/0235160 | A1 | 9/2011 | Hsieh et al. | |
| 2012/0018861 | A1* | 1/2012 | Kozaka | H01L 23/36 257/668 |
| 2012/0056859 | A1* | 3/2012 | Chen | G09G 3/20 345/204 |

FOREIGN PATENT DOCUMENTS

| | | |
|---|---|---|
| JP | 2004356568 | 12/2004 |
| JP | 2005153321 | 6/2005 |
| JP | 2006143797 | 6/2006 |
| JP | 2012133933 | 7/2012 |

* cited by examiner

*Primary Examiner* — Tuan T Dinh
(74) *Attorney, Agent, or Firm* — F. Chau & Associates, LLC

(57) ABSTRACT

A display panel includes a display panel having a curved shape and a printed circuit hoard (PCB). At least one carrier connects the display panel and the PCB. At least one driving integrated circuit (driving IC) is disposed on each carrier. Each carrier includes a body and at least one connector extending from the body. Each connector is spaced apart from each other connector.

17 Claims, 12 Drawing Sheets

DISPLAY DEVICE

CROSS-REFERENCE TO RELATED APPLICATION

This application claims priority under 35 U.S.C. § 119 to Korean Patent Application No. 10-2014-0130140, filed on Sep. 29, 2014, in the Korean intellectual Property Office, the disclosure of which is incorporated by reference herein in its entirety.

1. TECHNICAL FIELD

Exemplary embodiments of the present invention relate to a display device, and more particularly to a method of manufacturing the display device.

2. DISCUSSION OF RELATED ART

A liquid crystal display (LCD) is a type of flat panel display (FPD). LCDs may include two substrates with electric field generating electrodes (e.g., pixel electrodes and common electrodes) disposed thereon and a liquid crystal layer disposed therebetween. Upon applying voltage to the electrodes, liquid crystal molecules of the liquid crystal layer are rearranged, thereby adjusting an amount of light that is transmitted.

As LCD devices are used as a display device of television receivers, a screen of the LCD devices has become larger. However, as the screen size is enlarged, a viewing angle difference may be increase when a viewer looks at a center portion of a screen compared with when the viewer looks at left and right end portions of the screen.

A curved-type display device has been developed where end portions of the LCD are roundly curved with respect to a center portion. A curved display device may compensate for the viewing angle differences.

The curved-type display device may include a display panel and a bottom case having a curved form. A plurality of tape carriers may be disposed between the display panel and a printed circuit board (PCB) to electrically connect the tape carriers and the display panel.

When the display device is completed, a source PCB may be rotated with respect to the tape carriers to be disposed at a bottom surface of a bottom cover.

Before the source PCB is moved to the bottom surface of the bottom case, a curvature of the source PCB may be substantially identical to the curvature of the display panel. After the source PCB is moved to the bottom surface of the bottom case, the curvature of the source PCB may be increased. Thus, the source PCB may be subject to tensile force from the curved opposite sides of the source PCB and the source PCB may be continuously subject to stress. Accordingly, the stress may affect the tape carriers connected thereto. For example, tape carriers including a relatively weak material may be torn by the stress. This may cause damage on line patterns and driving integrated circuit (IC) of the tape carriers.

SUMMARY

Exemplary embodiments of the present invention are directed to a display device configured to reduce or prevent damage to line patterns (e.g., conductive line patterns) and a driving IC of carriers, and to a method of manufacturing the display device.

According to an exemplary embodiment of the present invention, a display panel includes a display panel having a curved shape and a printed circuit board (PCB). At least one carrier connects the display panel and the PCB. At least one driving integrated circuit (driving IC) is disposed on each carrier. At least one carrier includes a body. At least two connectors extend from the body. The at least two connectors are spaced apart from each other. The at least two connectors may define at least one side of the carrier.

The display device may include at least one pad electrode respectively disposed on at least one connector.

At least two connectors include at least one first connector extending from a first side of the body. The at least one first connector is coupled to the PCB. At least one second connector extends from a second side of the body. At least one second connector is coupled to the display panel.

At least one carrier has at least one hole disposed in a border area between at least two connectors and the body.

A space surrounded by the hole may be connected to a space between adjacent connectors.

The hole may have one of circular, oval, or polygonal shapes.

Each connector may have straight sides or curved sides.

Each connector may have a side that is bent.

the carrier may include longer connectors, as disposed closer to a center portion of the display panel.

At least one carrier may have a film shape or a tape shape.

According to an exemplary embodiment of the present invention, a method of manufacturing a display device includes connecting a first end of at least one carrier to a display panel and a second end of the at least one earlier to a printed circuit board (PCB). The at least one carrier includes at least one driving integrated circuit (driving IC) and at least two pad electrodes. The method includes cutting a part of at least one carrier to form at least two connectors spaced apart from each other.

The method may include forming at least one hole passing through a border area between at least two connectors and the body.

The hole may have a circular, oval, or polygonal shape.

The carrier may include longer connectors, as disposed closer to a center portion of the display panel.

Each connector may have straight sides or curved sides.

Each connector may have a side that is bent.

Cutting part of the at least one carrier may be performed by a laser beam.

The part of the at least one carrier is between the pad electrodes

A carrier according to exemplary embodiments of the present invention includes a plurality of first and second connectors spaced apart from each other. Accordingly, the first and second connectors may extend in a direction of tensile force caused when a source PCB and a display panel are bent. Thus, the stress induced on the carrier may be reduced or prevented, and damage on line patterns and data driving IC of the carrier may be reduced or prevented.

BRIEF DESCRIPTION OF THE DRAWINGS

A more complete appreciation of the present invention wall become more apparent by describing in detail exemplary embodiments thereof with reference to the accompanying drawings, wherein.

DETAILED DESCRIPTION

Figure 1:
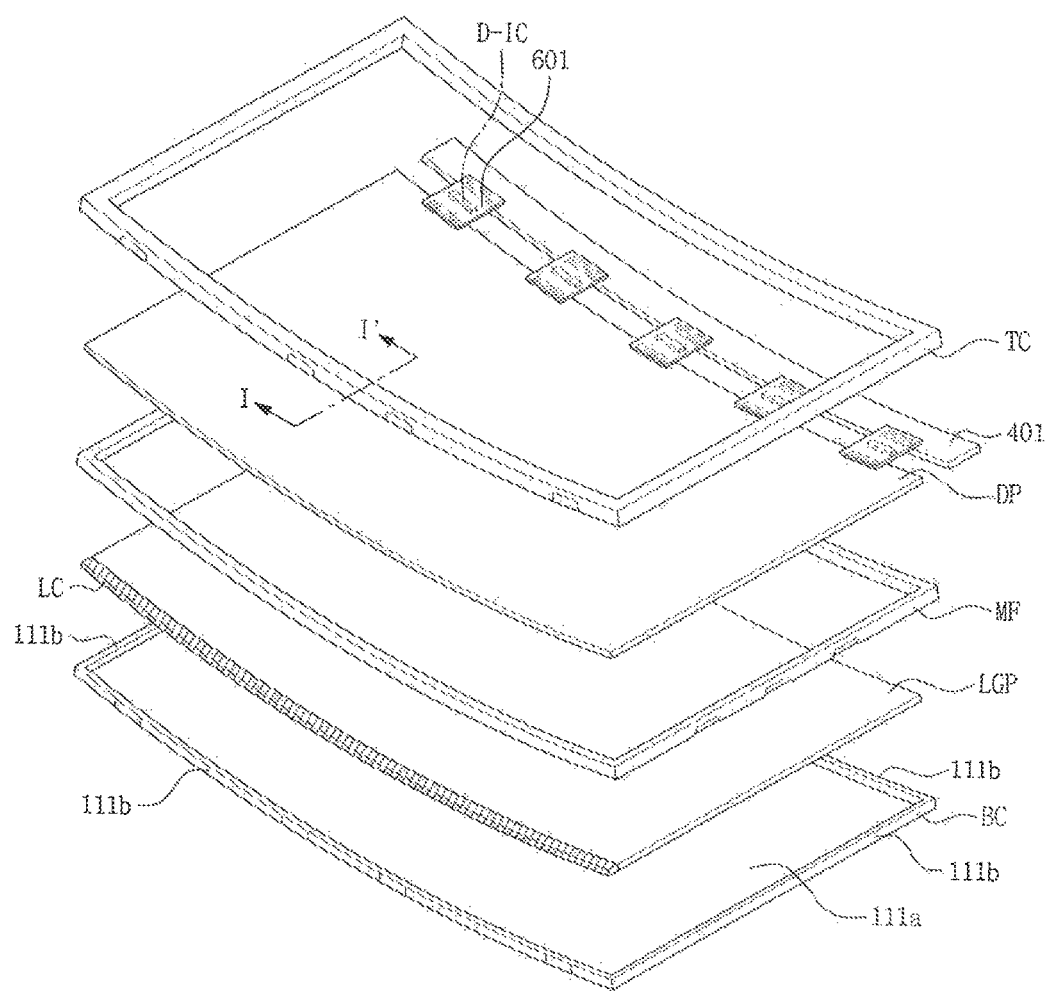
FIG. 1 is an exploded perspective view illustrating a display device including a backlight unit according to an exemplary embodiment of the present invention.

Hereinafter, exemplary embodiments of the present invention will be described in more detail with reference to the accompanying drawings. The present invention may, however, be embodied in many different forms and should not be construed as being limited to the embodiments set forth herein. Like reference numerals may refer to like elements throughout the specification and drawings.

In the drawings, thicknesses may be illustrated in an enlarged manner in order to clearly describe a plurality of layers and areas. Like reference numbers may be used to denote like elements throughout the specification and drawings. When an element or layer is referred to as being "on", "engaged to", "connected to" or "coupled to" another element or layer, it may be directly on, engaged, connected or coupled to the other element or layer, or intervening elements or layers may be present.

The spatially relative terms "below", "beneath.", "lower", "above", "upper", and the like, may be used herein to describe the relationship between an element or component and another element or component as illustrated in the drawings. It will be understood that the spatially relative terms may encompass different orientations of the device in use or operation, in addition to the orientation depicted in the drawings. The device may also be oriented in the other direction, and thus the spatially relative terms may be interpreted differently depending on the orientations.

It will be understood that, although the terms "first," "second," "third," and the like may be used herein to describe various elements, these elements should not be limited by these terms.

Terms and names of elements used herein may differ from the actual names of products.

Hereinafter, a backlight unit according to an exemplary embodiment of the present invention will be described with reference to FIGS. 1 to 3.

Figure 2:
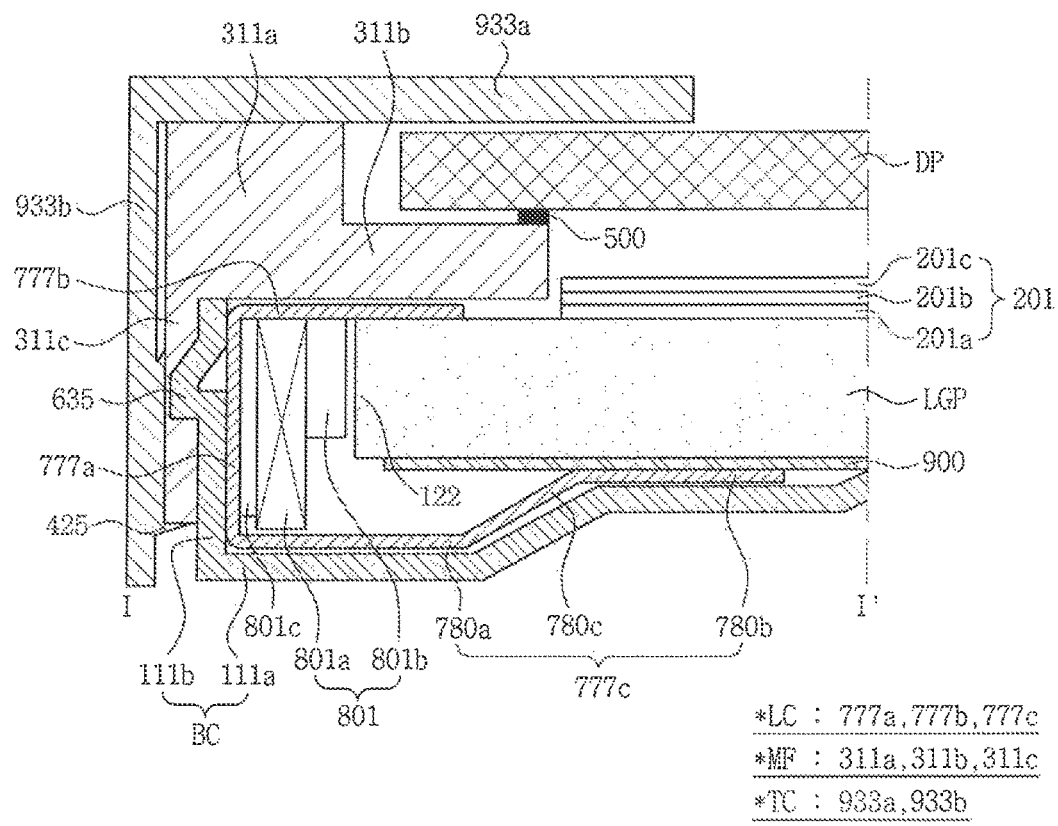
FIG. 2 is a cross-sectional view taken along line 14 of FIG. 1.

FIG. 1 is an exploded perspective view illustrating a display device including a backlight unit according to an exemplary embodiment of the present invention and FIG. 2 is a cross-sectional view taken along line I-I' of FIG. 1.

Referring to FIG. 1 and FIG. 2, a display device according to an exemplary embodiment of the present invention is a curved-type display device having opposite sides roundly curved with respect to a center portion of a display area of the display device. Hereinafter, unless otherwise defined, all elements of the display device may include bendable materials.

The curved display device according to an exemplary embodiment of the present invention may include a bottom case BC, a reflective sheet 900, a light guide plate LGP, an optical sheet 201, a light source unit 801, a light source cover LC, a mold frame MF, a display panel DP, and a top cover TC. The above-listed elements may have a curved shape in accordance with a curved surface form of the display panel DP. A backlight unit may include the reflective plate 900, the light guide plate LGP, the optical sheet 201, the light source unit 801, the light source cover LC and the mold frame MF. The display panel DP and the backlight unit may be coupled together (e.g., laminated together) to form a display module. The display module may include the top cover TC and the bottom case BC. The top cover TC and the bottom case BC may be configured to protect the display panel DP. The top cover TC and the bottom case BC may fix the display panel DP, a backlight unit and a driving circuit board (not illustrated) configured to drive the display panel DP in a desired position in the curved display device.

The bottom case BC may include an accommodation area. The reflective sheet 900, the light guide plate LGP, the optical sheet 201, the light source unit 801, and the light source cover LC may be disposed in the accommodation area. The bottom case BC may include a bottom portion 111a and a plurality of side portions 111b. The bottom portion 111a and the plurality of side portions 111b may be configured to fix components disposed in the accommodation area in a desired position. For example, the bottom portion 111a may have a quadrangular shape, and the side portions 111b may respectively protrude from each edge portion of the bottom portion 111a to have a predetermined height. The adjacently disposed edge portions of the side portions 111b may be connected to each other. An area defined by the side portions 111b and the bottom portion 111a may form the accommodation area. A locking projection 635 may be disposed at the outside of the side portions 111b between the side portions 111b and the mold frame MF. The side portions 111b may be fixed to the bottom case BC by the locking projection 635. A part of the side portion 111b may be bent and may protrude toward the mold frame MF to form the locking projection 635.

The light source unit 801 may produce light and may include a printed circuit board (PCB) 801a and at least one light source 801b. The PCB 801a may have a curved shape.

A surface of the PCB 801a may include at least one mounting area and a line (e.g., a conductive line) area. When two or more light sources are provided, each light source may be disposed on a separate mounting area and a plurality of lines (e.g., conductive lines) may be disposed on the wiring area to apply a driving power to the light sources. The driving power may be generated from a power generator (not illustrated) and applied to the plurality of lines via a separate connector (not illustrated).

The light source 801b may emit light outwards and may be disposed on the PCB 801a. The light source 801b may be a light emission package including at least one light emitting diode (LED). According to an exemplary embodiment of the present invention, the light emission package may include red, green, and/or blue LEDs, respectively emitting red, green, and/or blue light. The light emission package may combine light of three colors to produce white light. According to an exemplary embodiment of the present invention, the light emission package may only include a blue LED. In this case, fluorescent materials (e.g., phosphors), which are configured to convert blue light into white light, may be included in a light emission unit of the blue LED. Light emitted from the light source 801b may be emitted onto the light guide plate LGP.

The light guide plate LGP may have a curved polyhedral shape. A surface of the light guide plate LGP facing the light source 801b may be referred to as a light incident surface 122. The light incident surface 122 may have a curved shape. When the relatively longer sides of the display panel DP are curved, the display panel DP may be disposed so that the relatively longer sides correspond to the light incident surface 122. Light emitted from the light source 801b may be emitted onto the light incident surface 122 and may be transmitted toward the inside of the light guide plate LGP. Light emitted into the light guide plate LGP may be totally reflected. The light guide plate LGP may guide the light toward the display area of the display panel DP. Although not illustrated, a plurality of scattering patterns may be formed on a lower outer surface of the light guide plate LGP. The plurality of scattering patterns may increase reflectivity of the light guide plate LGP. The scattering patterns may have a gradually larger gap, as each scattering pattern is disposed farther from the light incident surface 122 of the light guide plate LGP.

The light guide plate LGP may include a light transmissive material including acrylic resins, such as polymethyl methacrylate, and/or polycarbonate (PC). The light transmissive material may guide light.

The reflective sheet 900 may be disposed at a lower portion of the light guide plate LGP. The reflective sheet 900 may reflect light passing through the lower outer surface of the light guide plate LGP and released outside the light guide plate LGP back toward the light guide plate LGP. Thus, a loss of light from the light guide plate LGP may be reduced or prevented.

The optical sheet 201 may be configured to diffuse and collect light transmitted from the light guide plate LGP. The optical sheet 201 may be disposed between the light guide plate LGP and the display panel DP. The optical sheet 201 may include a diffusion sheet 201a, a light collection sheet 201b, and a protective sheet 201c. The diffusion sheet 201a, the light collection sheet 201b, and the protective sheet 201c may be sequentially disposed on the light guide plate LGP.

The diffusion sheet 201a may diffuse light guided from the light guide plate LGP. The diffusion sheet 201a may reduce or prevent partial concentration of light.

The prism sheet 201b may be disposed on the diffusion sheet 201a and may be configured to collect light diffused front the diffusion sheet 201a in a direction perpendicular to the display panel DP. Prisms having a triangular cross-section may be aligned in a predetermined arrangement on a surface of the light collection sheet 201b.

The protective sheet 201c may be disposed on the collection sheet 201b and may protect a surface of the collection sheet 201b. The protective sheet 201c may diffuse light to create substantially uniform light distribution. The light passing through the protective sheet 201c may be directed toward the display panel DP.

The light source cover LC may surround the side of the light guide plate LGP. The light source unit 801 and the light incident surface 122 may be disposed in an accommodation area of the light source unit 801. The light source cover LC may align the light incident surface 122 and the light source 801b. Thus, light emitted from the light source 801b may be radiated onto the light incident surface 122 of the light guide plate LGP. The light source cover LC may have a curved shape. When the light guide plate LGP includes a flexible material that might not self-maintain a predetermined shape (e.g., a curved shape), the light source cover LC may force the light guide plate LGP to maintain the curved shape.

The light source cover LC may include a metal material, for example, stainless steel.

The light source cover LC may include a light source equipment portion 777a, an upper cover 777b, and a lower cover 777c.

The upper cover 777b may extend from an edge portion of a side of the light source equipment portion 777a toward the upper outer surface of the light guide plate LGP.

The lower cover 777c may extend from an edge portion of an opposed side of the light source equipment portion 777a toward the lower outer surface of the light guide plate LGP. The lower cover 777c may have any desired shape. For example. The lower cover 777c may have a shape in accordance with a shape of the bottom portion 111a of the bottom case BC. For example the lower cover 777c may include a first horizontal portion 780a having a predetermined length and extending from the side of the light source equipment portion 777a, a second horizontal portion 780b disposed closer to the lower surface of the light guide plate LGP than the first horizontal portion 780a, and an inclined portion 780c connecting the first and second horizontal portions 780a and 780b.

The light source 801b and the PCB 801a may be disposed in an accommodation area surrounded by the light source equipment portion 777a and the upper and lower covers 777b and 777c. An adhesive member 801c may be disposed between the PCB 801a and the light source equipment portion 777a. The light source unit 801 may be attached to the light source equipment portion 777a by the adhesive member 801c. For example, the adhesive member 801c may be a double-sided tape. One adhesive surface of the double-side tape may be attached to the PCB 801a.

The mold frame MF may support the display panel DP and the top cover TC, which may be fixed to the bottom case BC. The mold frame MF may support a gap between the display panel DP and the optical sheet 201. The mold frame MF may have a quadrangular frame shape that includes first and second supports 311a and 311b and a fixing member 3110.

The first support 311a may be disposed on the plurality of side portions 111b and may support the top cover TC.

The second support 311b may extend from an inner edge portion of the first support 311a toward the optical sheet 201. The second support 311b may have a shorter height than the first support 311a. The height difference between the first and second supports 311a and 311b may form a space between the top cover TC and the second support 311b and an edge portion of the display panel DP may be disposed in the space. A buffer pad 500 may be disposed on an end portion of the second support 311b between the second support 311b and the display panel DP. The buffer pad 500 may protrude from an end portion of the second support 311b toward the display panel DP. The edge portion of the display panel DP may be disposed on the buffer pad 500. The buffer pad 500 may prevent the display panel DP and the second support 311b from coming into direct contact with each other, thereby preventing scratches on the display panel DP.

The fixing member 311c may extend from the lower side surface of the first support 311a toward the side portion 111b. A coupling groove may be defined on an inner side surface of the fixing member 311c (e.g., a surface facing the locking projection 635). The locking projection 635 may be disposed in the coupling groove, such that the mold frame MF may be fixed to the bottom case BC.

The top cover TC may have a quadrangular frame shape on which an opening may be defined at the center portion thereof. The top cover TC may be disposed on the display panel DP. A display area A1 of the display panel DP may be exposed through the opening of the top cover TC. The top cover TC may cover the edge portion of the display panel, upper and side surfaces of the first support 311a, and a side surface of the fixing member 311c. The top cover TC may have a front surface cover 933a that covers the edge portion of the display panel DP and the upper surface of the first support 311a and a side surface cover 933b that covers the respective side surfaces of the first support 311a and the fixing member 311c. A hook 425 may be disposed inside the side surface cover 933b, and the hook 425 may be in contact with a lower surface of the fixing member 311c disposed on the mold frame MF. The top cover TC may be fixed to the mold frame MF by the hook 425. An aperture may be defined on a part of at least one of the side surface cover 933b. A PCB 401 may be exposed through the aperture.

The display panel DP may receive an image data signal from a system and light may be emitted from the backlight unit to display an image. The display panel DP may have a rectangular shape. In this case, two relatively longer sides, which may be referred to as long sides, may be curved, while two relatively shorter sides, which may be referred to as short sides, may be straight. In some exemplary embodiments of the present invention, the long sides may be straight and the short sides may be curved.

The display panel illustrated in FIG. 1 will be described below in more detail with reference to FIGS. 3 and 4.

Figure 3:
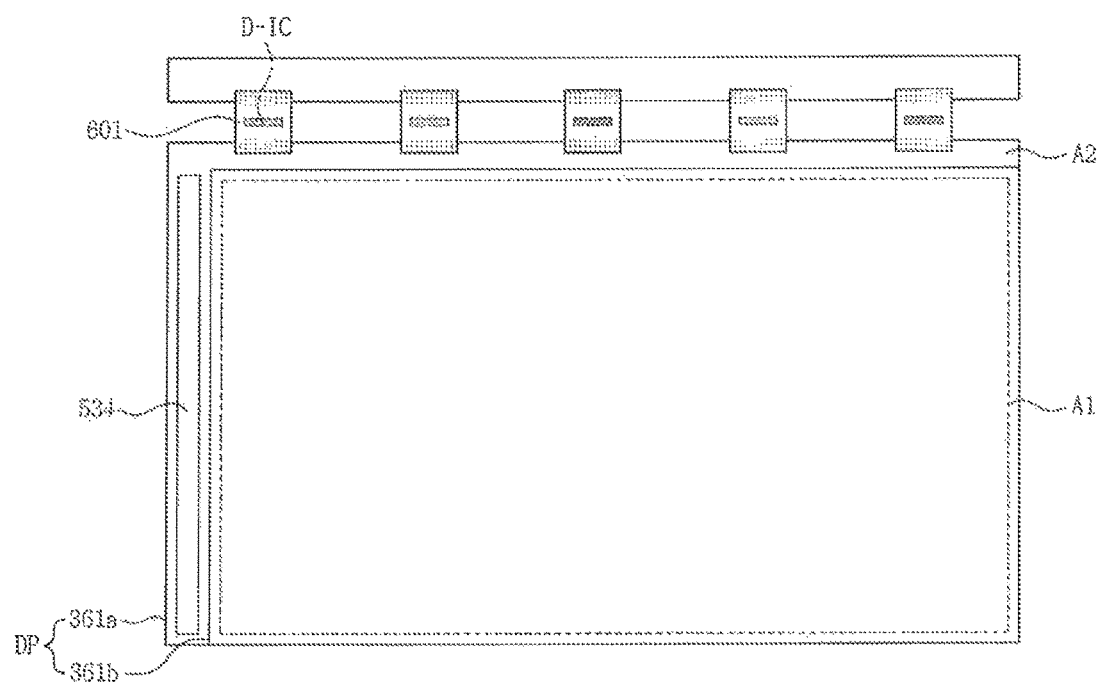
FIG. 3 is a detailed configuration view illustrating a display panel of FIG. 1.
Figure 4:
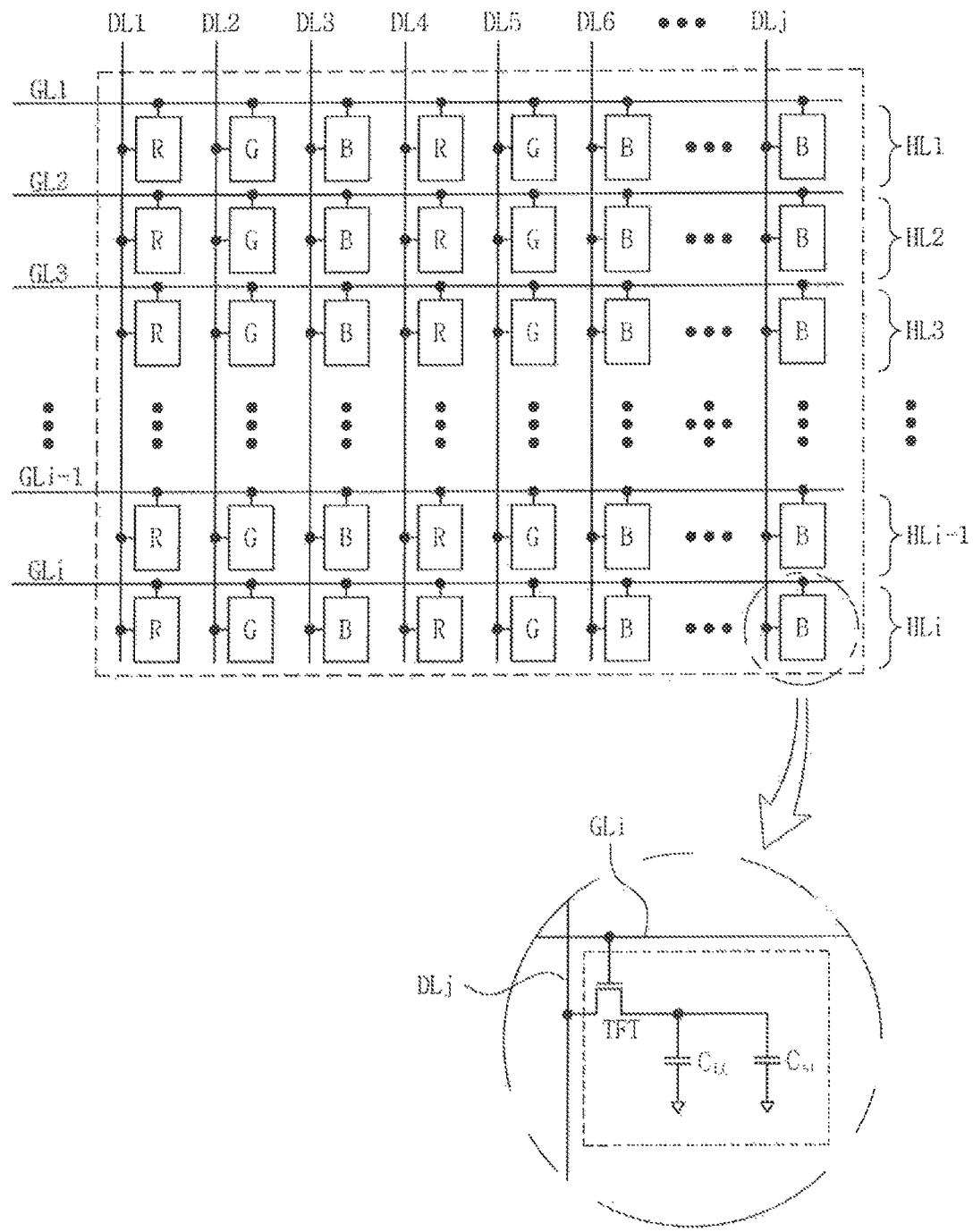
FIG. 4 is a schematic plan view illustrating an arrangement of pixels disposed on a display area of FIG. 3.

FIG. 3 is a detailed configuration view illustrating a display panel of FIG. 1 and FIG. 4 is a schematic plan view illustrating an arrangement of pixels disposed on a display area of FIG. 3.

Referring to FIG. 3 and FIG. 4, the display panel DP may include a lower substrate 361a and an upper substrate 361b facing each other with a liquid crystal layer disposed therebetween.

The lower substrate 361a may include the display area A1 and a non-display area A2. In the display area A1 a plurality of gate lines, a plurality of data lines intersecting the gate lines, and a plurality of pixels connected to the gate and data lines may be disposed.

The upper substrate 361b is disposed on the lower substrate 361a. The upper substrate 361b may cover an entire surface of the display area A1 of the lower substrate 361b.

The upper and lower substrates 361a and 361b may each have a plurality of surfaces. The plurality of surfaces of the upper and lower substrates 361a and 361b may each include front and rear surfaces facing each other with a liquid crystal layer disposed therebetween.

Although not illustrated, a black matrix, a plurality of color filters, and a common electrode may be disposed on the front surfaces of the upper and/or lower substrates 361a and 361b.

The black matrix may be disposed on the front surfaces of the upper and/or lower substrates 361a and 361b, except for an area corresponding to a pixel area.

The color filters may be disposed on the pixel area. The color filters may include red, green, and/or blue color filters.

The pixels may be disposed in a matrix form in the display area A1. The pixels may include red R, green G, and blue B pixels, which may be respectively disposed corresponding to the red, green, and blue color filters. The red, green, and blue pixels R, G, B adjacently disposed in a horizontal direction may form a unit pixel for displaying a unit image.

J pixels may be disposed along an $n^{th}$ (n is a number selected from 1 to i) horizontal line. The j pixels may be referred to as $n^{th}$ horizontal line pixels. Each of the $n^{th}$ horizontal line pixels may be respectively connected to one of a first to the $j^{th}$ data line (e.g., DL1 to DLj). The $n^{th}$ horizontal line pixels may connect the $n^{th}$ gate lines (e.g., GU to GU) to each other. Accordingly, the $n^{th}$ horizontal line pixels may receive an $n^{th}$ gate signal together. That is, j pixels aligned in the same horizontal line may receive the same gate signal, while pixels aligned in different horizontal lines may receive different gate signals. For example, both red and green pixels R and G disposed on the first horizontal line HL1 may receive a first gate signal, while red and green pixels R and G disposed on the second horizontal line HL2 may receive a second gate signal that has a different timing compared to the first gate signal.

Each pixel may include a thin film transistor (TFT), a liquid crystal capacitor CLC, and an auxiliary storage capacitor Cst.

The TFT may be turned on according to a gate signal applied from the gate line GL. The turned on TFT may apply an analog image data signal applied from the data line DL to the liquid crystal capacitor CLC and the auxiliary capacitor Cst.

The liquid crystal capacitor CLC may include a pixel electrode and a common electrode.

The auxiliary capacitor Cst may include a pixel electrode and an opposing electrode. The opposing electrode may be a front gate line or a common line transmitting a common voltage.

A gate driver 534 may be disposed in the non-display area A2. For example, the gate driver 534 may be disposed in an area of the non-display area A2 that is adjacent to a left edge portion of the display area A1.

The gate driver 534 may produce a gate signal according to a gate control signal applied from a timing controller and sequentially applies the gate signal to the plurality of gate lines. The gate driver 534 may include, for example, a shift register that shifts a gate start pulse according to a gate shift clock to produce a gate signal. The shift register may include a plurality of switching elements. The plurality of switching elements may be disposed on the front surface of the lower substrate 361a in a same arrangement as the TFT of the display area A1.

A data driving integrated circuit (IC) D-IC may receive a digital image data signal and a data control signal from the timing controller. The data driving IC D-IC may perform sampling of the digital image data signal according to the data control signal, may perform latching of the sampled image data signal corresponding to one horizontal line every horizontal period, and may transmit the latched image data signal to the data lines DL1 to DLj. The data driving IC D-IC may convert the digital image data signal transmitted from the timing controller into an analog image signal using a gamma voltage supplied from a power supplier, and may transmit the signal to the data lines DL1 to DLj.

The data driving ICs D-IC may be disposed on one or more carriers 601.

The carriers 601 may have a tape or film shape.

The carriers 601 may electrically connect the source PCB 401 and the display panel DP. Each carrier 601 may include a plurality of pad electrodes. The pad electrodes may include a plurality of input terminals and a plurality of output terminals. The input terminals of the carrier 601 may be connected to output source signal lines (not illustrated) of the source PCB 401. The output terminals of the carrier 601 may be connected to a pad unit (not illustrated) disposed in the non-display area A2 of the display panel DP.

The pad unit may be connected to the data lines DTI to DLj through a link line. The pad unit may be disposed on an area of the non-display area A2 adjacent to an upper edge portion of the display area A1.

A first side of the carrier 601 on which the input terminals are disposed (e.g., a side closer to the source PCB 401) may be bonded by an anisotropic conductive bonding film. A second side of the carrier 601 on which the output terminals are disposed (e.g., a side closer to the display panel DP) may be bonded by an anisotropic conductive bonding film The carriers 601 may include a flexible material that can be bent. For example, the carriers 601 may include a polyimide that has a high coefficient of thermal expansion (CTE) and that is relatively durable. The carriers 601 may include a synthetic resin, such as acrylic, polyether nitrile, polyethersulfone, polyethylene terephthalate, and/or polyethylenenaphthalate.

A part of the output source signal lines may transmit image data signals and data control signals applied from the timing controller to the data driving IC D-IC disposed on the carrier 601. The data driving IC D-IC may receive an image data signal and a data control signal through input line patterns (not illustrated), such as conductive line patterns, disposed on the carrier 601. Then, the data driving IC D-IC may output an analog image data signal through output line patterns, such as output conductive line patterns, disposed on the carrier 601. An end portion of each input line pattern may correspond to the above-described input terminal and an end portion of each output line pattern may correspond to the output terminal.

The output source signal lines may transmit a gate control signal to the gate driver 534 through auxiliary line patterns, such as auxiliary conductive line patterns, disposed on one of the carriers 601 and auxiliary lines disposed on a corner portion of the lower substrate 361a. The auxiliary line patterns may be disposed on an outer side of one of the carriers 601 or on outer sides of each of the carriers 601. For example, the auxiliary line patterns may be disposed on one carrier 601 disposed on the left side of the display device.

The carrier illustrated in FIG. 3 will be described below in more detail with reference to FIG. 5.

Figure 5:
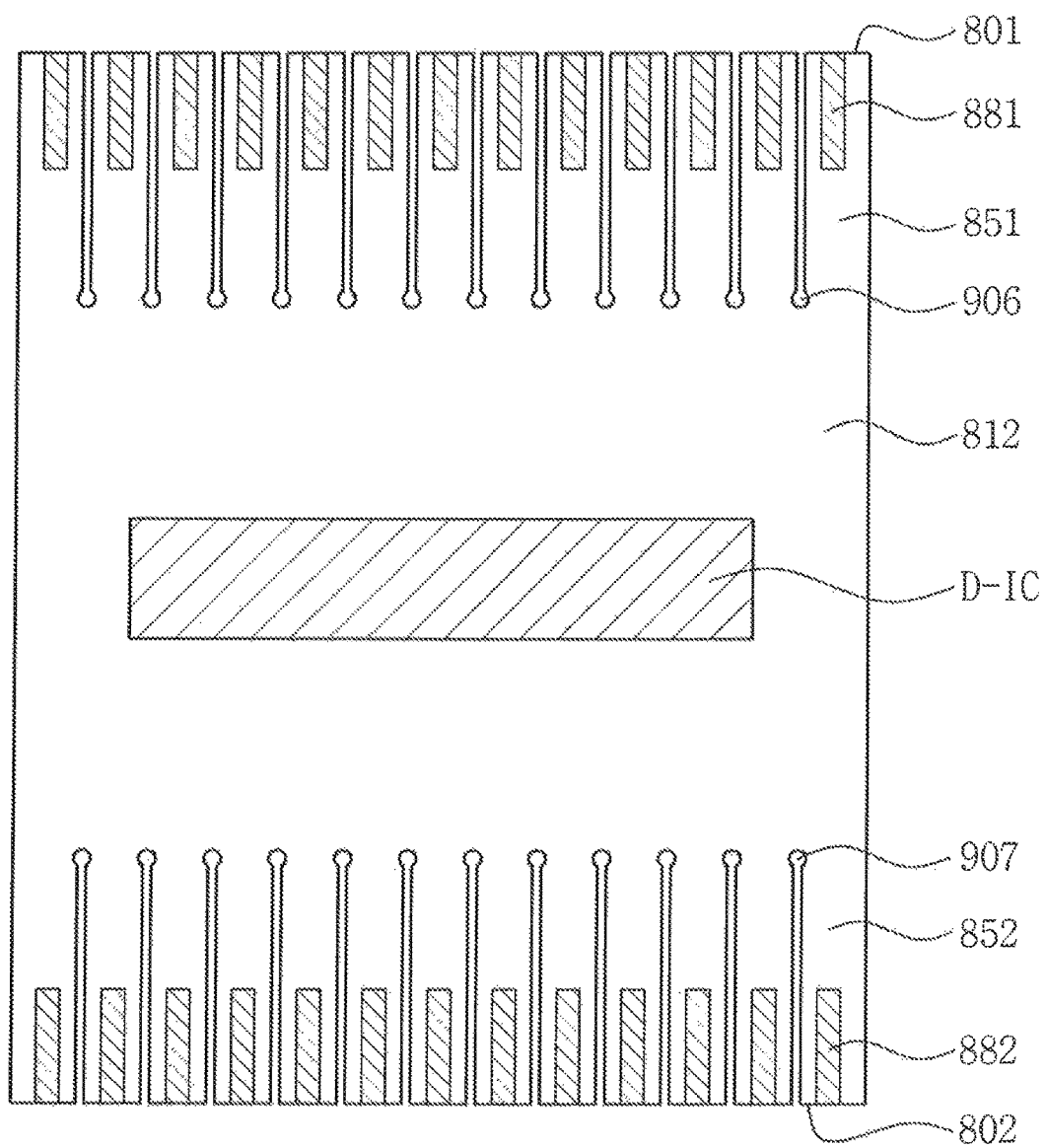
FIG. 5 is a detailed configuration view illustrating one of carriers illustrated in FIG. 3 according to an exemplary embodiment of the present invention.

FIG. 5 is a detailed configuration view illustrating one of the carriers illustrated in FIG. 3. FIG. 5 illustrates an orientation in which the carrier illustrated in Ha 3 is turned upside down.

The carrier 601 may include a body 812, the data driving IC D-IC disposed on the body 812, and a plurality of connectors 851 and 852 extending from the body 812.

The plurality of connectors 851 and 852 may include a plurality of first connectors 851 extending from a first side of the body 812 and a plurality of second connectors 852 extending from a second side of the body 812.

The first connectors 851 may define a first side 801 of the carrier 601. That is, a plurality of the one sides 801 of the first connectors 851 is brought together to form one side of the carrier 601. The second connectors 852 may define a second side 802 of the carrier 601. That is, a plurality of the one sides 802 of the second connector 852 is brought together to form another side of the carrier 601.

The first connectors 851 may be spaced apart from each other by a predetermined distance. Distances between each of the first connectors 851 adjacently disposed to each other may be substantially equal. Alternatively, a distance between at least two of the first connectors 851 may be different from distances between the other first connectors 851.

The first connectors 851 may be disposed on the source PCB 401. Each first connector 851 may partially or entirely overlap the source PCB 401.

An input terminal 881 may be disposed on each of the first connectors 851. The number of the first connectors 851 may be the same as the number of the input terminals 881. For example, one input terminal 881 may be disposed on one first connector 851. Alternatively, the number of the first connectors 851 may be smaller than the number of the input terminals 881. For example, two or more input terminals 881 may be disposed on at least one first connector 851. For example, as a width of the first connectors 851 increases, more input terminals 881 may be disposed on each of the first connectors 851. The number of the first connectors 851 may be larger than the number of the input terminals 881. For example, input terminals 881 might not be disposed on one or more of the first connectors 851.

The second connectors 852 may be spaced apart from each other by a predetermined distance. Distances between each of the second connectors 852 adjacently disposed to each other may be equal. Alternatively, distances between at least two of the second connectors 852 may be different from distances between the other second connectors 852.

The second connectors 852 may be disposed on the display panel DP. For example, each second connector 852 may partially or entirely overlap the display panel DP.

An output terminal 882 may be disposed on each of the second connectors 852. The number of the second connectors 852 may be the same as the number of the output terminals 882. For example, one output terminal 882 may be disposed on each of the second connectors 852. Alternatively, the number of the second connectors 852 may be smaller than the number of the output terminals 882. For example, two or more output terminals 882 may be disposed on at least one of the second connectors 852. For example, as a width of the second connectors 852 increases, more output terminals 882 may be disposed on each of the second connectors 852. The number of the second connectors 852 may be larger than the number of the output terminals 882. For example, output terminals 882 might not be disposed on at least one of the second connector 852.

At least one first hole 906 may be defined in the carrier 601. The first hole 906 may be disposed at a border area between the body 812 and the first connectors 851. The first hole 906 may prevent the body 812 from being torn at a space between the first connectors 851 disposed adjacent to each other.

A space surrounded by the first hole 906 may be connected to a space between the first connectors 851 disposed adjacent to each other.

The first hole 906 may be circular in shape. However, in some exemplary embodiments of the present invention, the first hole 906 may have other shapes, such as an oval or a polygon, other than the circular shape. When a plurality of the first holes 906 are included in the carrier 601, some of the plurality of first holes 906 may have a circular shape and others of the plurality of first holes 906 may have an oval or polygonal shape.

At least one second hole 907 may be disposed in the carrier 601. The second hole 907 may be disposed at a border area between the body 812 and the second connectors 852. The second hole 907 may prevent the body 812 from being torn at a space between the second connectors 852 disposed adjacent to each other.

A space surrounded by the second hole 907 may be connected to a space between the second connectors 852 disposed adjacent to each other.

The second hole 907 may be circular in shape. However, in some exemplary embodiments of the present invention, the second hole 907 may have other shapes, such as an oval or a polygon, other than the circular shape. When a plurality of the second holes 906 are included in the carrier 601, some of the plurality of second holes 906 may have a circular shape and others of the plurality of second holes 907 may have an oval or polygonal shape.

Other carriers 601 according to exemplary embodiments of the present invention may have the same configuration as the carrier 601 illustrated in FIG. 5.

Figure 6:
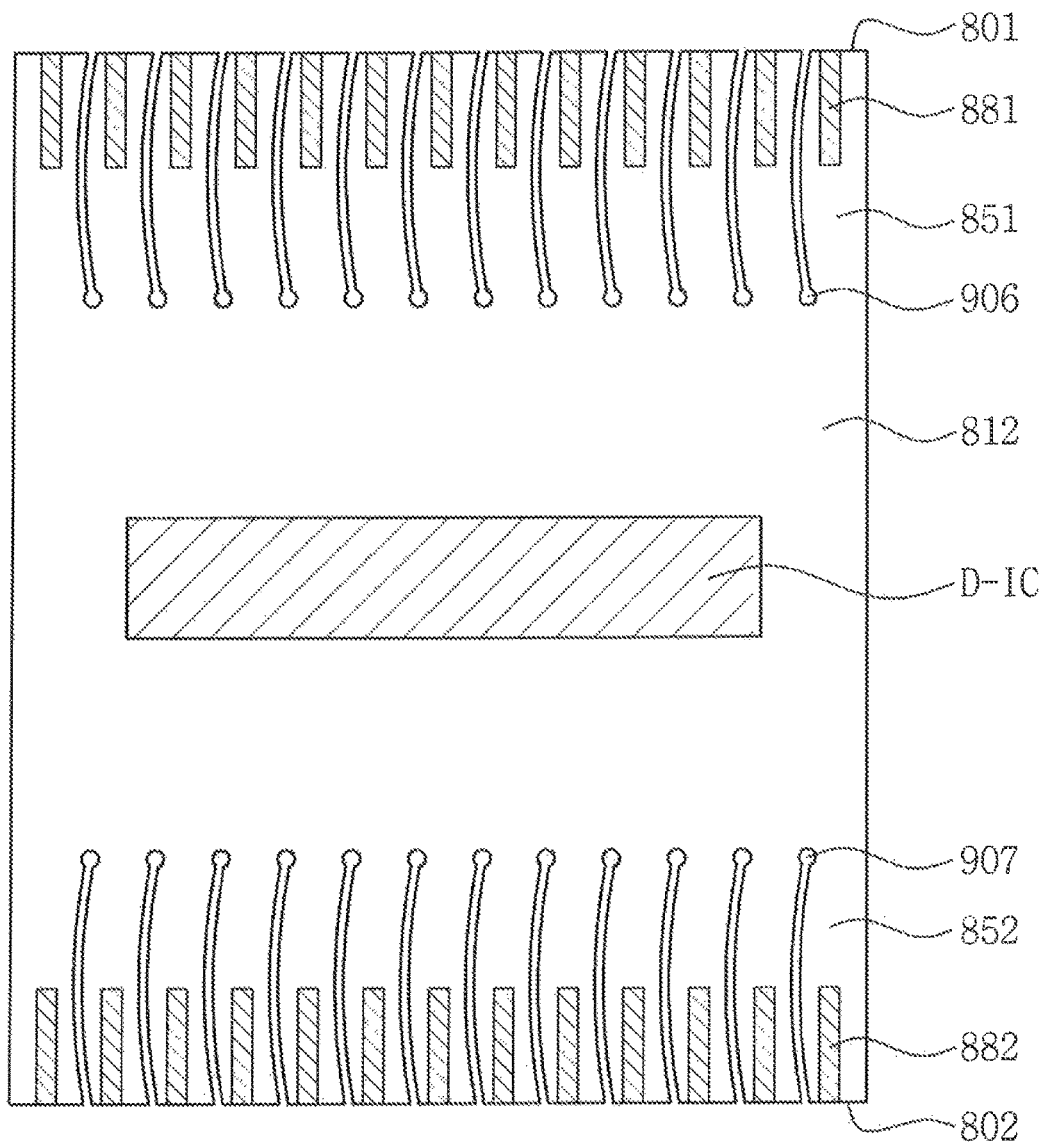
FIG. 6 is a detailed configuration view illustrating one of the carriers illustrated in FIG. 3 according to an exemplary embodiment of the present invention.

FIG. 6 is a detailed configuration view illustrating one of the carriers illustrated in FIG. 3 according to an exemplary embodiment of the present invention. FIG. 6 illustrates a configuration in which the carrier illustrated in FIG. 3 is turned upside down.

Referring to FIG. 6, the first connector 851 may have curved sides. Facing sides of the first connector 851 disposed adjacent to each other may have a curved shape. The second connector 852 may have curved sides. Facing sides of the second connector 852 disposed adjacent to each other may have a curved shape.

Other components of the carrier 601 illustrated in FIG. 6, but not discussed with reference to FIG. 6, may be the same as the carrier 601 illustrated in FIG. 5 except for the curved sides, and repetitious descriptions may be omitted.

Other carriers according to exemplary embodiments of the present invention may have the same configuration as the carrier 601 illustrated in FIG. 6.

The first and second connectors 851 and 852 may have sides that are bent in shape (e.g., a V-shape). The bent shape of the first and second connectors 851 and 852 will be described in more detail with reference to FIG. 7.

Figure 7:
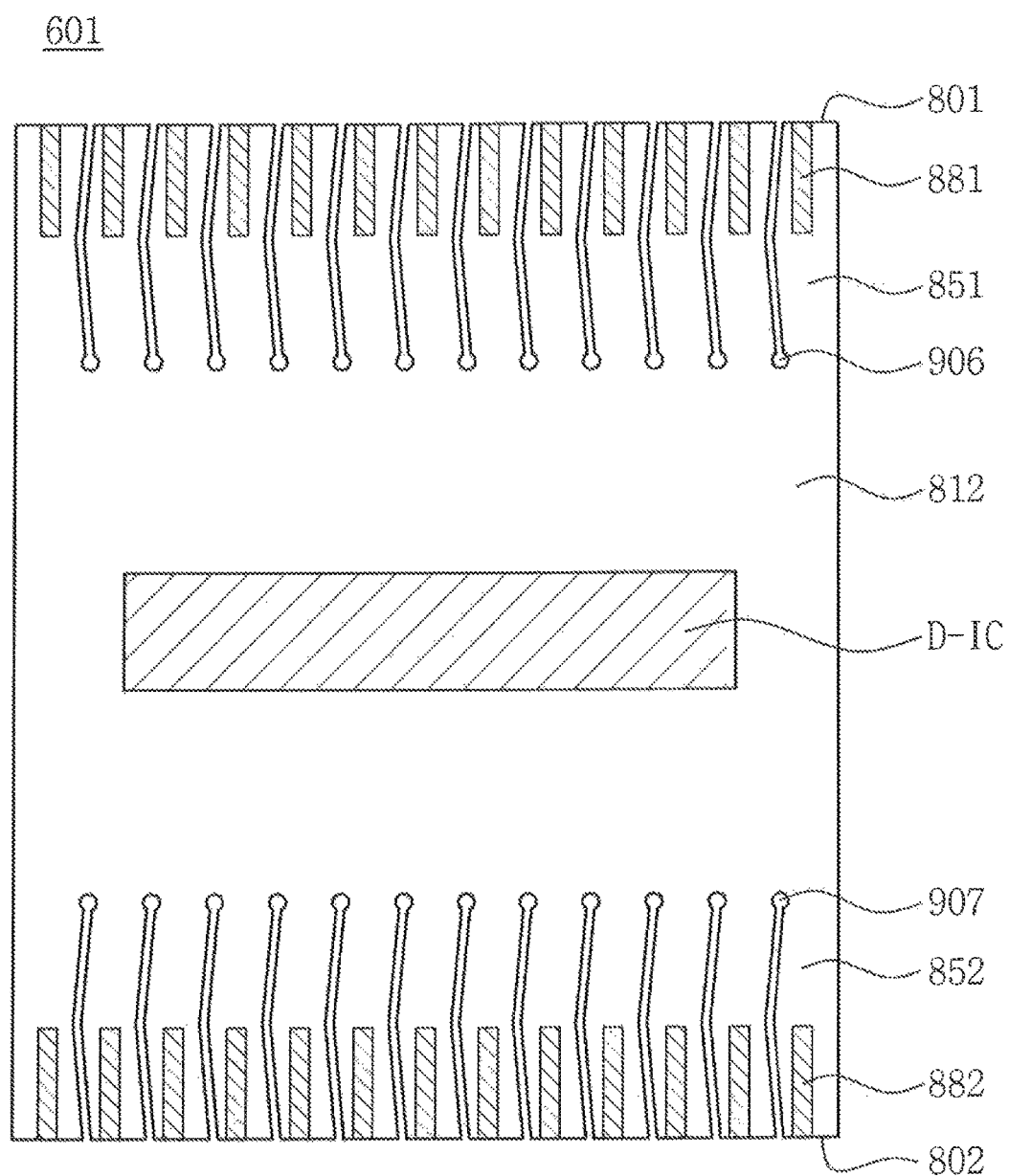
FIG. 7 is a detailed configuration view illustrating one of the carriers illustrated in FIG. 3 according to an exemplary embodiment of the present invention.

FIG. 7 is a detailed configuration view illustrating one of the carriers illustrated in FIG. 3 according to an exemplary embodiment of the present invention. FIG. 7 illustrates a configuration in which the carrier illustrated in FIG. 3 is turned upside down.

The carrier 601 may have a configuration illustrated in FIG. 7, rather than that of FIG. 5. Referring to FIG. 7, the first connector 851 may have V-shaped sides. Sides of the first connectors 851 disposed adjacent to each other may have a. V-shape. The second connector 852 may have V-shaped sides. Sides of the second connector 852 disposed adjacent to each other may have a V-shape.

Other components for the carrier 601 illustrated in FIG. 7, but not discussed with reference to FIG. 7, may be substantially the same as the carrier 601 illustrated in FIG. 5 except for the V-shaped sides, and repetitious descriptions may be omitted.

Other carriers according to exemplary embodiments of the present invention may have the same configuration as the carrier 601 illustrated in FIG. 7.

The plurality of carriers 601 may include the first and second connectors 851 and 852 respectively having different lengths from each other. In an exemplary embodiment of the present invention, the plurality of carriers 601 may include longer first and second connectors 851 and 852, as disposed closer to the center portion of the display panel DP. This will be described below in more detail with reference to FIG. 8.

Figure 8:
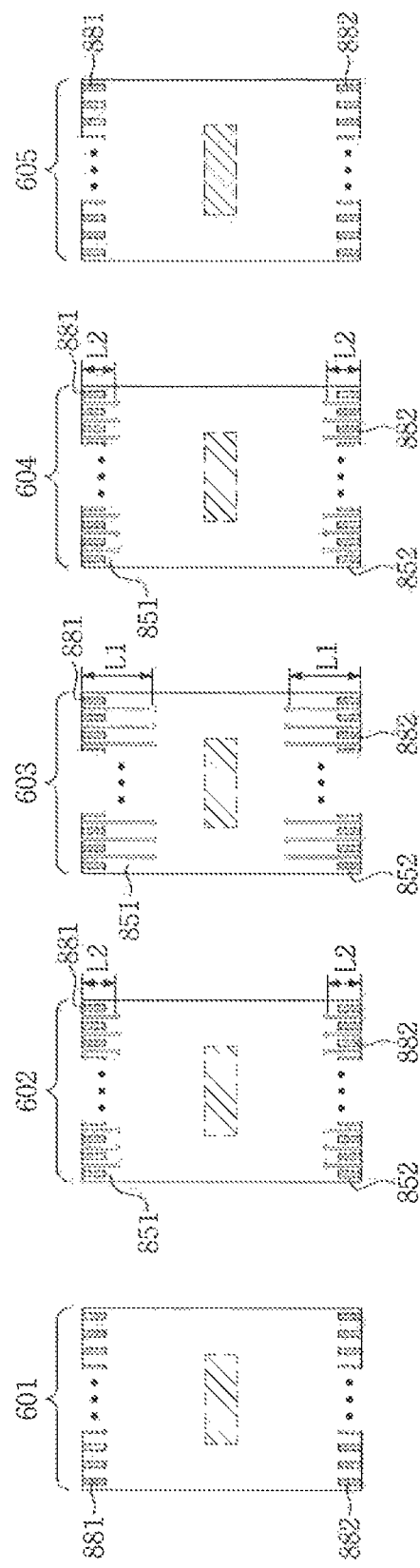
FIG. 8 is a detailed configuration view illustrating the carriers illustrated in FIG. 3.

FIG. 8 is a detailed configuration view illustrating the carriers illustrated in FIG. 3.

The carrier 601 of five carriers illustrated in FIG. 8 may be referred to as a first carrier 601 and the other four carriers illustrated in FIG. 8 may be referred to as the second carrier 602, the third carrier 603, the fourth carrier 604 and the fifth carrier 605, respectively.

The third carrier 603 disposed at the center of the display panel DP may include first and second connectors 851 and 852 having a longest length L1.

The first carrier 601 disposed at the left edge portion of the display panel DP may have first and second connectors 851 and 852 having a shortest length. Herein, the first and second connectors 851 and 852 provided in the first carrier 601 have, substantially, a size of 0. That is, the first carrier 601 might not include the first and second connectors 851 and 852.

The fifth carrier 605 disposed at the right edge portion of the display panel DP may have first and second connectors 851 and 852 having the shortest length. Herein, the first and second connectors 851 and 852 provided in the fifth carrier 601 have, substantially, a size of 0. That is, the fifth carrier 605 might not include the first and second connectors 851 and 852.

The first and second connectors 851 and 852 of the second carrier 602 may have a length L2 that is shorter than that of the third carrier 603 and longer than that of the first carrier 601.

The first and second connectors 851 and 852 of the fourth carrier 604 may have a length L2 that is shorter than that of the third carrier 603 and longer than that of the fifth carrier 605.

According to exemplary embodiments of the present invention, the carrier 601 may include a plurality of first and second connectors 851 and 852 spaced apart from each other. Accordingly, the first and second connectors 851 and 852 may extend in a direction of tensile force generated when the source PCB 401 and the display panel DP are bent. Therefore, stress might not accumulate on the carrier 601, such that the line patterns (e.g., the conductive line patterns) and the data driving IC D-IC of the carrier 601 need not be damaged.

A method of manufacturing the display device according to an exemplary embodiment of the present invention will be described, in more detail below with reference to FIGS. 9A to 9D.

FIGS. 9A to 9D are views illustrating a method of manufacturing a display device according to an exemplary embodiment of the present invention.

Figure 9A:
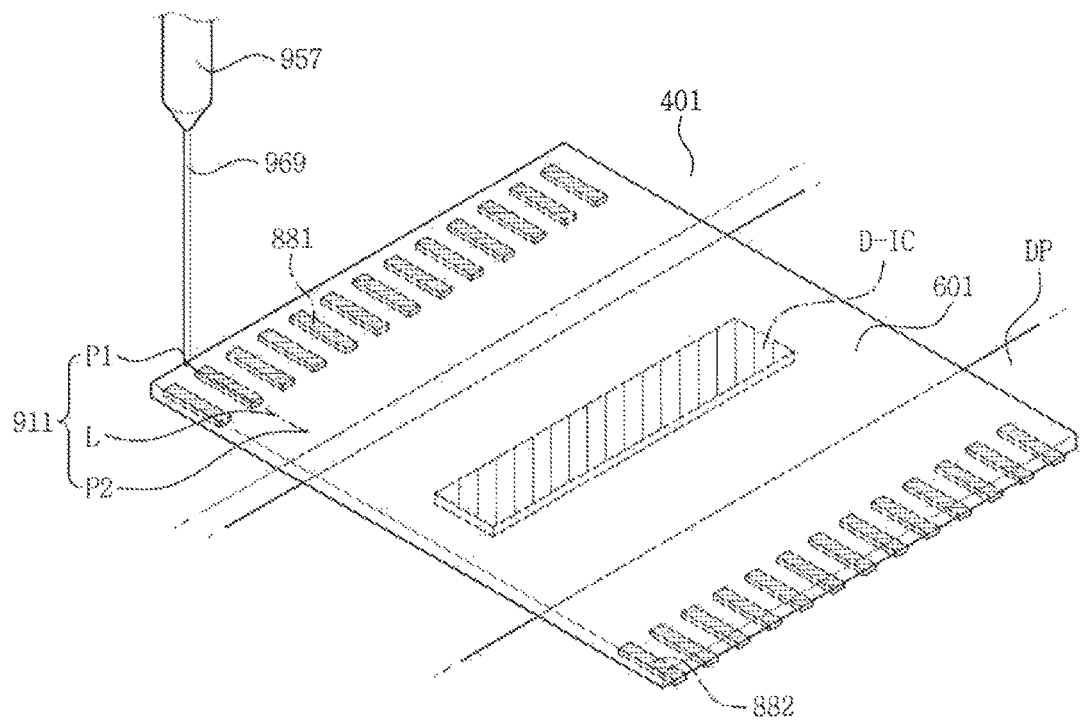
FIGS. 9A to 9D are views illustrating a method of manufacturing a display device according to an exemplary embodiment of the present invention.

Referring to FIG. 9A, the carrier 601 including the data driving IC D-IC may be provided. The carrier 601 may connect the source PCB 401 and the display panel DP. A part of the carrier 601 between the input terminals 881 may be cut (e.g., the carrier 601 may be partially cut between input terminals 881). The cutting may be performed as follows.

An imaginary cutting line 911 may be defined on the carrier 601. The imaginary cutting line 911 may include a first point P1 disposed on a side of the carrier 601, a second point P2 disposed between the input terminals 881 and the data driving IC D-IC, and a line L connecting the first and second points P1 and P2 and extending between the input terminals 881 adjacently disposed to each other.

A laser cutting apparatus 957 may be aligned on the first point P1. A laser beam 969 may be outputted from the laser cutting apparatus 957. The laser beam 969 outputted from the laser cutting apparatus 957 may be radiated on the first point P1.

Figure 9B:
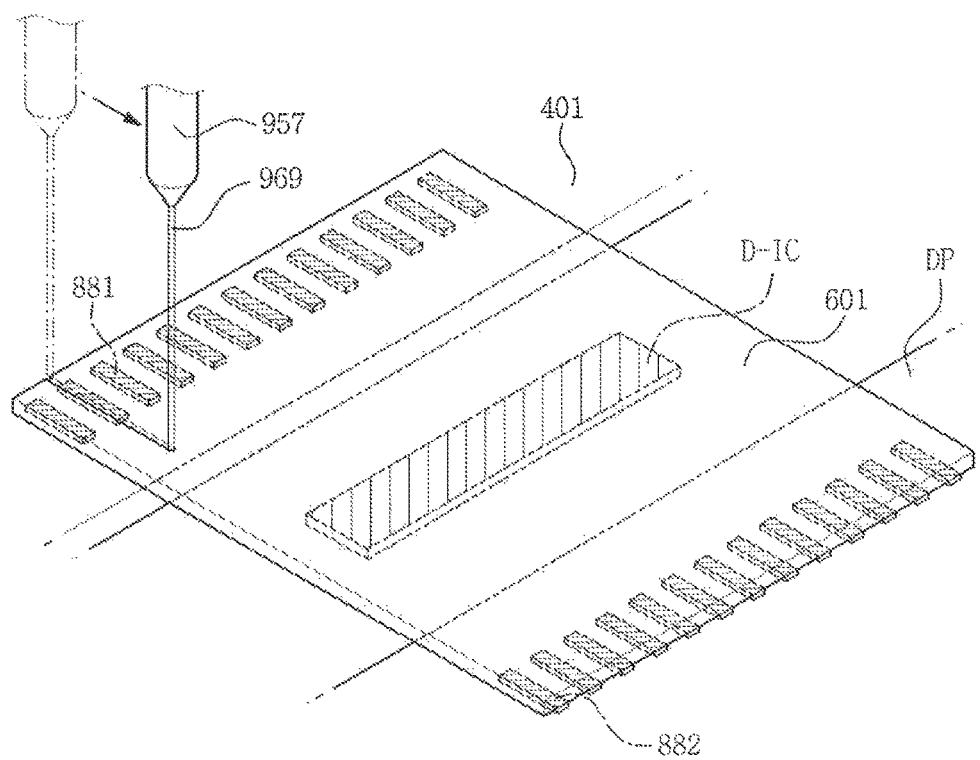

Referring to FIG. 9B, the laser cutting apparatus 957 may move from the first point P1 to the second point P2. The laser beam 969 may move along the imaginary cutting line 911, and a part of the carrier 601 disposed on the imaginary cutting line 911 may be removed.

Figure 9C:
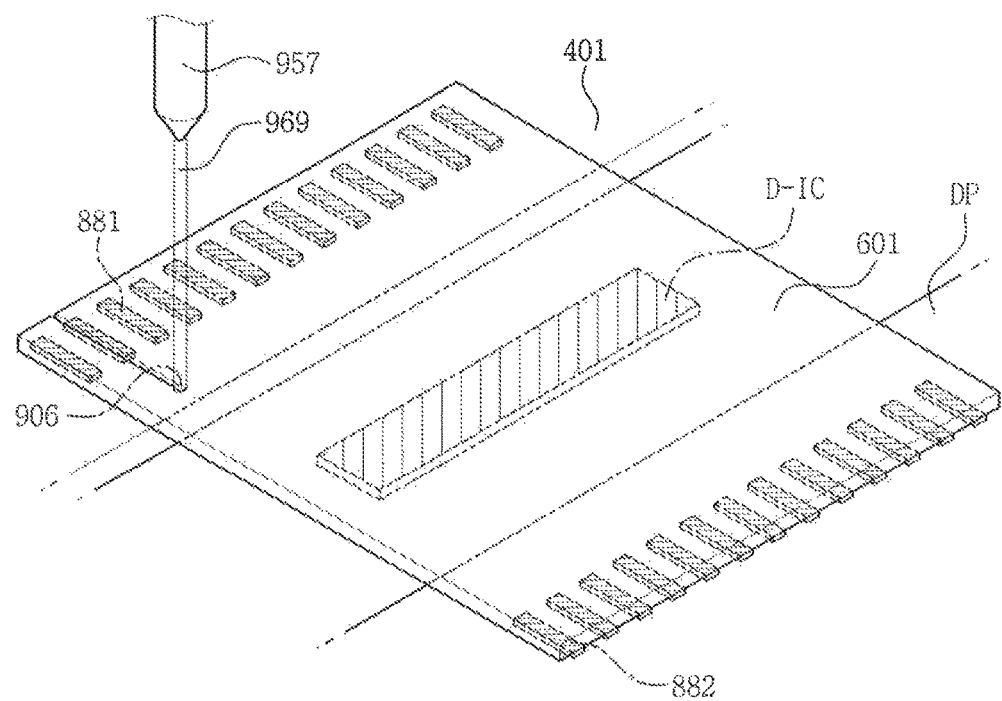

Referring to FIG. 9C, with the laser cutting line 957 aligned on the second point P2, a width of the laser beam 969 may be expanded. A first hole 906 may be defined on the carrier 601 corresponding to the second point P2.

Figure 9D:
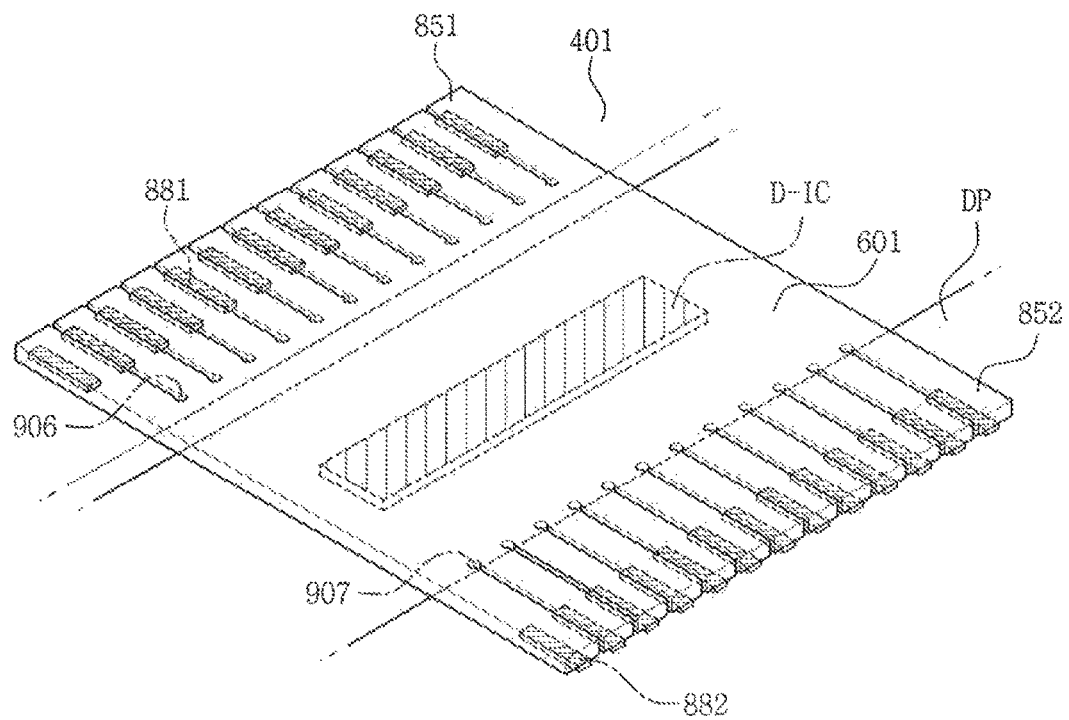

Referring to FIG. 9D, the above-described cutting process may be performed between other input and output terminals 881 and 882, thereby manufacturing a carrier 601 including the body 812 (see, e.g., FIG. 5), a plurality of first and second connectors 851 and 852 and a plurality of holes 906 and 907.

The cutting process may also be performed on other carriers than carrier 601, such as carriers 602, 603, 604 and/or 605. The carrier of the first to fifth carriers 601 to 605 disposed closer to the center portion of the display panel DP may be cut by a relatively longer imaginary cutting line 911. For example, the third carrier 603 may have the longest imaginary cutting line 911. The imaginary cutting lines 911 on the first to fifth carriers 601 to 605 may be straight or may have a curved shape.

The bottom case BC having a curved shape may be prepared. The bottom case BC may include a hard material, such as metal, and may be initially formed to have curvature curved shape. Therefore, the bottom case BC may maintain the curved shape without applying an external force to the bottom case BC.

The reflective sheet 900 may be disposed on the bottom portion 111a of the bottom case BC. The reflective sheet 900 may include a flexible material that is bendable. Accordingly, when the reflective sheet 900 is disposed on the bottom portion of the bottom case BC, the reflective sheet 900 may be curved as according to the shape of the bottom case BC.

On an upper portion of the reflective sheet 900, the light guide plate LGP, which may include the light source cover LC and the light source unit 801, may be disposed.

The light source cover LC may include a hard material, such as metal, and may be initially formed to have a curved shape.

The light source cover LC may be curved as according to the shape of the bottom case BC. The light guide plate LGP may include a flexible material. Therefore, the light guide plate LGP may be curved to have the same shape as the bottom case BC by the light source cover LC including the hard material.

The PCB 801a of the light source unit 801 may include a flexible material, such as polyimide. Therefore, when coupled to the light source cover LC, the PCB 801a may be curved to have the same shape as the bottom case BC.

The optical sheet 201 may be disposed on the light guide plate LGP. The optical sheet 201 may include a flexible material. Accordingly, the optical sheet 201 may be curved to have the same shape as the bottom case BC.

The mold frame MF may be disposed on side portions 111b of the bottom case BC and the display panel DP may be disposed on the second support 311b of the mold frame MF. The mold frame MF and the display panel DP may include a flexible material, such as a plastic. The mold frame MF and the display panel DP may maintain a curved shape, as the bottom case BC is coupled to the top cover TC. The source PCB 401 may be coupled to the display panel DP through the carriers 601.

The source PCB 401 may be rotated around the carriers 601 as an axis toward the bottom surface of the bottom case BC. Then, the source PCB 401 may be disposed on the bottom surface of the bottom case BC.

The top cover TC may be coupled to the bottom case BC disposed on the display panel DP. The top cover TC may include a hard material, such as metal, and may be initially formed into a curved shape as according to a shape of the bottom case BC. Therefore, the top cover TC may maintain the curved shape without applying an external force to the top cover TC. When the top cover TC and the bottom case BC are coupled to each other, the display panel DP and the mold frame MF disposed between the top cover TC and the bottom case BC may have a curved shape.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A display device comprising:
a display panel having a curved shape;
a printed circuit board (PCB);
at least one carrier connecting the display panel and the PCB;
at least one driving integrated circuit (driving IC) disposed on each carrier,
wherein the at least one carrier comprises a body and at least two connectors extend from a first side of the body,
wherein the at least two connectors define at least one side of the carrier,
wherein the at least two connectors are spaced apart from each other by a first distance,
wherein the at least one carrier includes at least one hole positioned at a border area between the body and the at least two connectors, and
wherein the at least one hole has a width wider than the first distance; and
at least one pad electrode respectively disposed on at least one connector.

2. The display device of claim 1, wherein the at least one carrier further comprises at least one other connector extending from a second side of the body and defining another side of the carrier,
wherein the at least two connectors are coupled to one of the PCB and display panel,
wherein the at least one other connector is coupled to another one of the PCB and display panel.

3. The display device of claim 1, wherein a space surrounded by the hole is connected to a space between adjacent connectors.

4. The display device of claim 1, wherein the hole has one of circular, oval, or polygonal shapes.

5. The display device of claim 1, wherein each connector has straight sides or curved sides.

6. The display device of claim 1, wherein each connector has a side that is bent.

7. The display device of claim 1, wherein the carrier comprises longer connectors, as disposed closer to a center portion of the display panel.

8. The display device of claim 1, wherein at least one carrier has a film shape or a tape shape.

9. The display device of claim 1, wherein the width of the at least one hole wider than the first distance is measured along a direction perpendicular to an extending direction of the at least two connectors.

10. A display device comprising:
a display panel having a curved shape;
a printed circuit board (PCB);

at least one carrier connecting the display panel and the PCB;

at least one driving integrated circuit (driving IC) disposed on each carrier, wherein the at least one carrier comprises a body and at least two connectors extend from a first side of the body, wherein the at least two connectors define one side of the carrier, wherein the at least two connectors are spaced apart from each other to form a slit between the at least two connectors along an extending direction of the at least two connectors, wherein the carrier includes at least one hole positioned at a border area between the body and the at least two connectors, and wherein the at least one hole has a width wider than a width of the slit; and at least one pad electrode respectively disposed on the at least one connector.

11. The display device of claim 10, wherein at least one carrier has a film shape or a tape shape.

12. A display device comprising:

a display panel having a curved shape;

a printed circuit board (PCB);

at least one carrier connecting the display panel and the PCB; and at least one driving integrated circuit (driving IC) disposed on each carrier, wherein the at least one carrier comprises a body and at least two connectors extend from a first side of the body, wherein the at least two connectors define one side of the carrier, wherein the at least two connectors are spaced apart from each other to form a slit between the at least two connectors along an extending direction of the at least two connectors, wherein the carrier comprises longer connectors, as disposed closer to a center portion of the display panel; and at least one pad electrode respectively disposed on the at least one connector.

13. The display device of claim 12, wherein the at least one carrier further comprises at least one other connector extending from a second side of the body and defining another side of the carrier, wherein the at least two connectors are coupled to one of the PCB and display panel, wherein the at least one other connector is coupled to another one of the PCB and display panel.

14. The display device of claim 12, wherein a space surrounded by the hole is connected to a space between adjacent connectors.

15. The display device of claim 12, wherein the hole have one of circular, oval, or polygonal shapes.

16. The display device of claim 12, wherein each connector has straight sides or curved sides.

17. The display device of claim 12, wherein each connector has a side that is bent.

* * * * *